Figure 1:
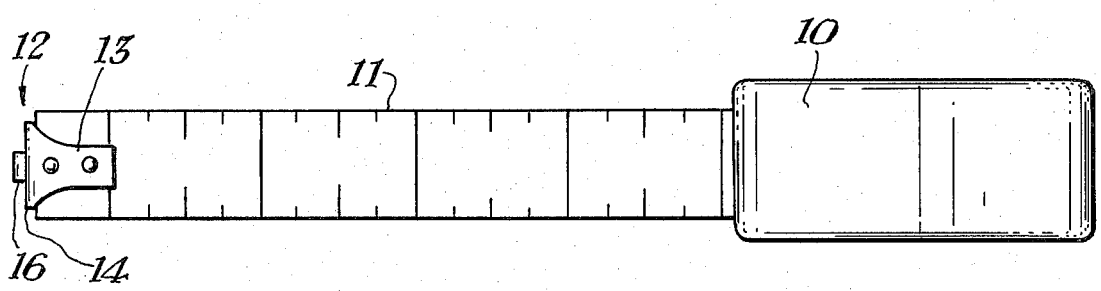

United States Patent [19]

Marcell

[11] 3,913,233

[45] Oct. 21, 1975

[54] MEASURING DEVICE

[76] Inventor: William B. Marcell, 3950 NW. 36 Terrace, Ft. Lauderdale, Fla. 33309

[22] Filed: May 1, 1974

[21] Appl. No.: 465,867

[52] U.S. Cl. .............................................. 33/137 R
[51] Int. Cl.² ........................................ G01B 3/10
[58] Field of Search ............... 33/137 R, 137 L, 138

[56] References Cited
UNITED STATES PATENTS

| 400,961 | 4/1889 | Soltmann | 33/137 R |
| 1,860,635 | 5/1932 | Thompson | 33/137 R |
| 3,745,663 | 7/1973 | Dodge | 33/137 R |

FOREIGN PATENTS OR APPLICATIONS

| 894,774 | 4/1962 | United Kingdom | 33/137 R |

*Primary Examiner*—Richard E. Aegerter
*Assistant Examiner*—Steven L. Stephan

[57] ABSTRACT

A measuring device of the flexible tape type, having an end tab at 90° to the plane of the tape carrying a rotatable tongue adapted to provide a recess for engaging the wall of a hollow object, such as a pipe, and being rotatable to a rest position against the tab when the device is not in use.

1 Claim, 5 Drawing Figures

U.S. Patent  Oct. 21, 1975  3,913,233

MEASURING DEVICE

This invention is directed to means for securing a measuring device with a fixed position with an article to be measured, such as a piece of pipe or electrical conduit, so that accurate measurement can be effected by a single operator without inadvertent disengagement of the measuring device from the article being measured while the measurement is being performed. This invention is directed specifically to flexible types of measuring devices commonly referred to as measuring tapes.

THE PRIOR ART

Measuring devices, including flexible measuring devices, have been used by artisans for centuries. Typical of the art at the date of filing this application is Lufkin Tape and Rule Catalog No. 106. Typical type of prior art devices are Lufkin Tapes Models C1512CH and 120CH, 125CH, displayed on page 8 of said catalog, in which a sturdy U-shaped hook is affixed to the end of the measuring device, and in three measuring devices shown on page 9 of said catalog, Models 120TP and C120TB, in which a sharp device designated a "special claw hook" is pivoted at the end of the measuring device for anchoring the bark in the log to be measured. This device has the disadvantage that the sharp hook can cause injury to the user if it is to be efficacious as an anchor to the bark of a tree.

ADVANTAGES OVER THE PRIOR ART

My device, more particularly described in the next section of this specification, has the advantages, first, that it has no sharp point to injure the user and further, that, being rotatable, it provides a more secure connection with the distal end of the article to be measured, and yet, when not in use, is snugly secured next to the container casing and out of the way. What is presently thought to be its best and highest use is for electricians or plumbers who are continuously confronted with the problem of measuring conduit or pipe before cutting it to the length required. Without the means here shown for securing the distal end of the measuring device to the conduit or pipe to be measured, the services of two workmen are required. If only one is used, accurate measurements are difficult and much time may be wasted in the measuring process. If the measurement is inaccurate, material is frequently wasted or rework is required. By the use of my invention the measurement can be effectively, accurately, and quickly performed by but one man.

DESCRIPTION OF THE DEVICE

Figure 4:
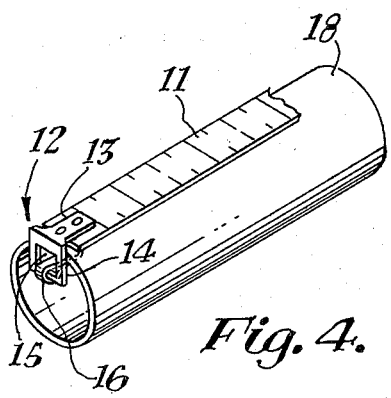
Figure 5:
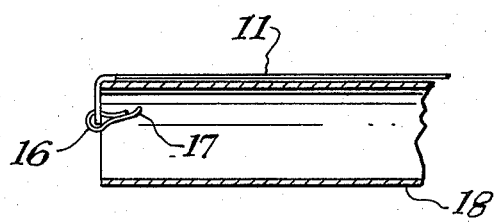
Figures 2, 3:
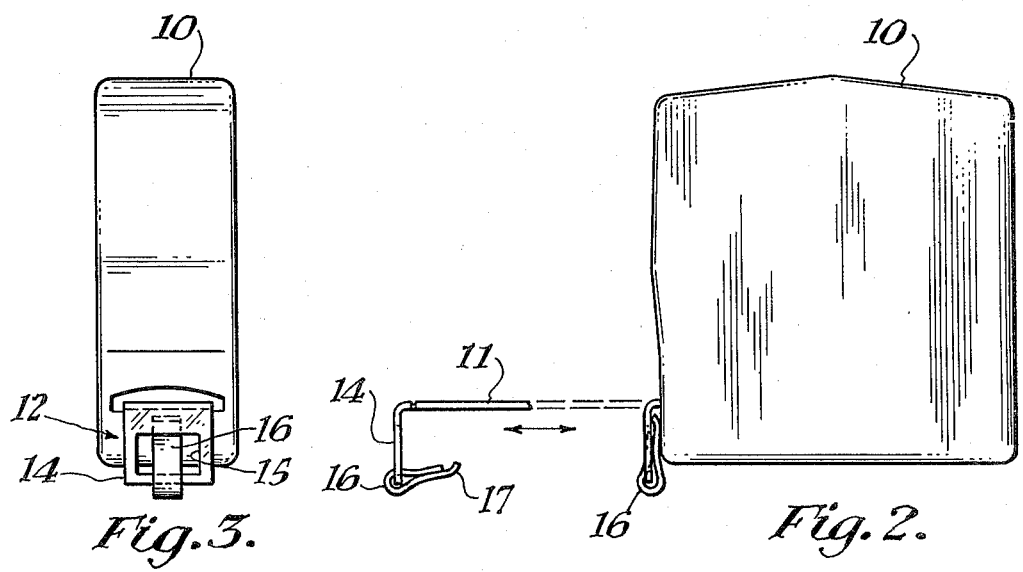

Referring now to the drawings:

FIG. 1 is a plan view of the measuring device;
FIG. 2 is a side elevation thereof;
FIG. 3 is an end elevation thereof;
FIG. 4 is a perspective view showing the measuring device, partly broken away, in engagement with a section of such an item as an electric conduit through the process of measurement;
FIG. 5 is a sectional view showing the engagement of the device with the conduit during the process of measurement as shown in FIG. 4.

Referring now to the figures of the drawing, particularly FIGS. 1 and 2, the device comprises a casing or container, 10, with a conventional spring-activated return mechanism pivoted at a central point within the container, none of which is shown as it is purely conventional. Within the container is a flexible tape, 11, calibrated for measurement, at the distal end of which is a tab 12 shown affixed to the end of the tape by a pair of rivets I designate the other end of the tape within the casing 10 as the "Proximal" end. The tab has a flat portion 13 which is riveted to the tape and a dependent portion 14 at approximately right angles to the flat portion 13 in which an opening 15 is provided. Riding in the opening is a tongue, 16 shown in side elevation in FIG. 2 in an operating position. It is noted that when the tongue 16 is rotated within the opening 15 its rotation is limited by the surfaces of engagement between the tongue and the lower portion of the opening so that it will rotate to an angle of approximately 85° with the dependent portion. In the preferred embodiments of the device, I have found that 85° is the optimum angular arrangement between the tongue 16 and the tab 12 when the device is being used. At the tip of the tongue 16 is a cam surface 17 slightly curved inwardly. The purpose of this is so that when the measuring device is retracted to a rest position, the tongue will slide easily against the wall of the casing 10 to the retracted position shown in FIG. 2 in the direction of the right arrow.

The operation of the device is shown in FIGS. 4 and 5, from which it can be seen that during the process of measurement, the tape is securely held in engagement with the object to be measured. After the operation of measurement has been completed, the measuring device can be flipped loose from the end of the object being measured and retracted to the rest position within the case as shown in the position indicated by the right arrow in FIG. 2.

Having fully described my invention, I claim:

1. A measuring device comprising a casing, a flexible tape having a distal end and a proximal end and being calibrated for linear measurement between said ends,
   a tab on the distal end of said measuring device, fixedly disposed at an angle of 90° to the plane of said measuring device,
   said tab having an opening through which a tongue looped and thereby held to said tab,
   said tongue being rotatable in said opening from a rest position in which it is in contact with the surface of said tab to an operating position at no more than 85°, said tongue having a curved portion, and in which the curved portion of the tongue is such that as the measuring device is being withdrawn into the casing, the tongue makes contact with the base of the casing to pivot itself into contact with the tab — has been inserted.

* * * * *